Sept. 22, 1931.    M. J. BOYLE    1,824,323
VALVE AND METHOD OF MANUFACTURE
Filed Nov. 21, 1927
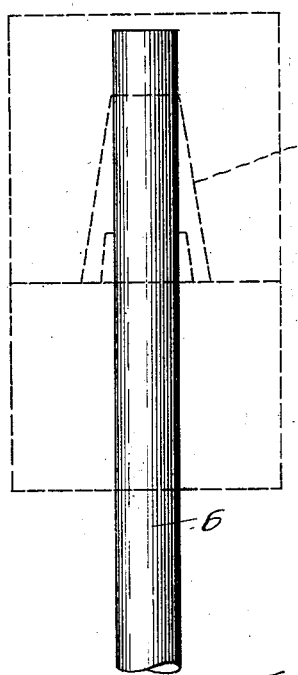
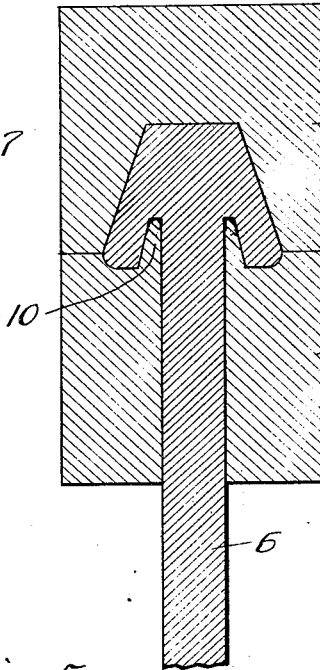
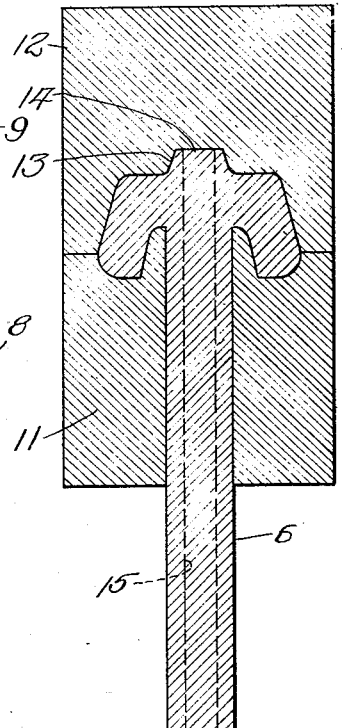
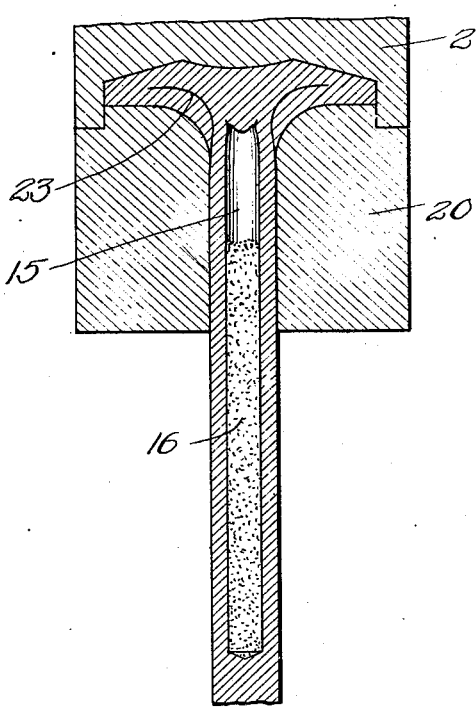
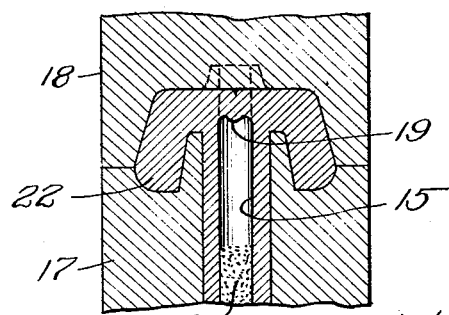
Inventor:
Michael J. Boyle,
By Glenn S. Noble
Atty.

Patented Sept. 22, 1931

1,824,323

UNITED STATES PATENT OFFICE

MICHAEL J. BOYLE, OF CHICAGO, ILLINOIS

VALVE AND METHOD OF MANUFACTURE

Application filed November 21, 1927. Serial No. 234,821.

This invention relates to valves or analogous headed devices and more particularly to valves formed of a single piece adapted for use in internal combustion engines. Among the novel features of this invention are the provision of a single-piece valve with a hollow stem which may contain a suitable salt or heat transferring material, preferably one of such nature which is a solid at ordinary temperatures but becomes liquid under relatively high temperatures; the provision of a single-piece valve having the head formed on the stem in such a manner as to permit a certain amount of give or resiliency when the head strikes the seat; and the method of manufacturing valves of this character whereby the heat transferring salt or the like may be securely enclosed in the hollow stem without the necessity of closing the plugs or the like.

The objects of this invention are to provide an improved valve of the character indicated; to provide a valve having its stem and head formed of a single piece and constructed in such manner as to give more or less resiliency or yielding of the head; to provide a valve having a hollow stem with heat transferring material therein; to provide an improved method of manufacturing valves; and to provide such other novel features and improvements in construction as will appear more fully hereinafter.

In the accompanying drawings,

Figure 1 is a side view of the stock or rod from which the valve is to be formed and also showing in dotted lines a preliminary forming or gathering operation;

Figure 2 is a sectional view of the stem and partially formed head shown in position in the forming dies;

Figure 3 is a view similar to Figure 2 showing the next step in the forming operation and also indicating in dotted lines the hole which is drilled into the stem after such operation;

Figure 4 is a similar view showing the next succeeding operation which closes the end of the hole after the heat transferring salt or material has been placed therein; and Figure 5 is a sectional view showing the final operation and also showing the completed valve.

In accordance with this invention, the valve is made from a rod or piece of stock 6 which may first be subjected to a preliminary gathering operation to form a conical end, as shown in dotted lines at 7 in Figure 1. The stem with this conical end is then subjected to the action of dies 8 and 9, as shown in Figure 2 to make the next forming operation. All of the lower forming dies have upwardly extending central conical projections, as shown at 10, which serve to form a recess in the head around the upper portion of the stem. This second operation shortens the partially formed conical head and increases its diameter. After this operation, the partially formed valve is subjected to the action of dies 11 and 12 which are similar to the preceding dies and intended to further widen and shorten the head, as clearly shown in Figure 3. The upper die 12 is provided with a central depression 13 which causes a projection 14 to be formed on the upper surface of the valve head. After this operation a hole 15 is drilled through the head and stem, as indicated in dotted lines in Figure 3. This hole may extend downwardly any desired distance, but preferably terminates at a point about opposite the lower end of the guide. On account of drilling the hole from the top, it may be made comparatively short and consequently is much cheaper to drill than if the hole were drilled from the bottom of the stem to the upper end thereof, as it is well known that it becomes exceedingly difficult and expensive to drill a long hole in steel or material of the character used in these valves. After the hole has been drilled, the salt or heat transferring material 16 is placed therein, and thereupon the upper end of the valve head is heated just sufficient for the next forming operation, as shown in Figure 4. In this operation the valve is subjected to the action of dies 17 and 18 which forces the material of the projection 14 into the upper end of the hole, as shown at 19, thereby completely closing the end of the hole. This will seal the material in the hole so that it will not be detrimental to the final forming operation which requires a comparatively high degree of heat. After the end of the hole has been closed, the head and adjacent portion of the stem is heated to a sufficiently high temperature to permit the final forming operation, as shown in Figure 5. In this operation the stem and head are subjected to the action of dies 20 and 21 which are of suitable conformation to complete the desired form of head. During this operation the downwardly extending flange-like portion 22 of the partially formed head, as shown in Figure 4, is folded or pressed inwardly against the adjacent portion of the stem, and the upper part of the blank is further compressed and forced downwardly into the end of the hole, thereby further tending to completely seal or close the same. This operation causes a joint or separation 23 which extends outwardly from the stem into the head, as shown in Figure 5, which tends to permit a certain amount of yielding or resiliency for the head with respect to the same so that the valve will have a cushioning effect at the time of impact with the valve seat or motor blocks.

From this description it will be seen that I provide a single-piece valve having a hollow stem, and the material placed therein will be securely sealed against any possibility of leakage. It will, however, be noted that different types of valves may require different characteristics, as, for instance, some changes may be desirable in the details of construction to adapt the valve for either intake or exhaust ports; therefore I do not wish to be limited to the exact construction herein shown and described. For instance, if a more rigid head is desired, the joint or division 23 may be lessened in extent or omitted, as could readily be done by leaving out the projection 10 in the forming dies. It will also be noted that more or less gathering or drawing operations may be necessary for different sized valves or for different materials; therefore the exact number of such operations is not critical in the present invention.

Having thus described my invention, what I claim and desire to secure by Letters Patent is:

1. A single-piece valve and stem having a separation extending from the upper end of the stem outwardly into the head.

2. A valve comprising a stem having an integrally formed head, the head having a flange-like inwardly-extending portion which lies closely against the upper portion and which engages with the upper end of the stem.

3. A valve of the character set forth having a head comprising two integrally formed thicknesses of metal, one thickness projecting outwardly from the end of the stem and forming the principal central portion of the head, and the other thickness projecting inwardly toward the stem.

4. A valve of the character set forth comprising a stem having a hole extending inwardly from the head end thereof and terminating at a substantial distance from the opposite end and having an integrally formed head forming a closure for the outer end of said hole and a heat transferring material in the hole.

5. A valve of the character described having a single-piece head whose central portion and upper portion are continuous with the stem, with a separating surface between said central portion and the lower part of the surrounding portion, said separating surface extending outwardly into the head beyond the stem.

6. A valve comprising a hollow stem in its upper portion, an integral head on said stem, said head having a surface of separation extending outwardly from the stem into the body thereof, to permit a yielding action between the head and stem.

MICHAEL J. BOYLE.